US009807256B1

(12) United States Patent
Bruno

(10) Patent No.: US 9,807,256 B1
(45) Date of Patent: Oct. 31, 2017

(54) SYSTEM AND METHOD FOR DESIGNING AND PRINTING FANTASY SPORTS DRAFT BOARD POSTERS

(71) Applicant: Brian Scott Bruno, St. Louis, MO (US)

(72) Inventor: Brian Scott Bruno, St. Louis, MO (US)

( * ) Notice: Subject to any disclaimer, the term of this patent is extended or adjusted under 35 U.S.C. 154(b) by 0 days.

(21) Appl. No.: 15/414,921

(22) Filed: Jan. 25, 2017

Related U.S. Application Data

(60) Provisional application No. 62/286,985, filed on Jan. 26, 2016.

(51) Int. Cl.
*G06K 15/02* (2006.01)
*H04N 1/00* (2006.01)

(52) U.S. Cl.
CPC ....... *H04N 1/00167* (2013.01); *H04N 1/0019* (2013.01); *H04N 1/00137* (2013.01); *H04N 1/00177* (2013.01); *H04N 2201/0082* (2013.01)

(58) Field of Classification Search
USPC .............. 358/1.1–3.29, 1.11–1.18, 535, 537, 358/452–462
See application file for complete search history.

(56) References Cited

U.S. PATENT DOCUMENTS

| | | |
|---|---|---|
| 4,027,882 A | 6/1977 | Rosenberg |
| 5,459,826 A | 10/1995 | Archibald |
| 6,911,992 B2 | 6/2005 | Bronstein |
| 7,287,781 B1 | 10/2007 | Hathaway |
| 8,406,460 B2 | 3/2013 | Cok |
| 8,484,564 B1 | 7/2013 | Marti |
| 9,077,823 B1 | 7/2015 | Grosz |
| 2006/0040719 A1 | 2/2006 | Plimi |
| 2008/0030785 A1 | 2/2008 | Kuchenmeister |
| 2017/0116648 A1* | 4/2017 | Vallaeys ............ G06Q 30/0276 |

OTHER PUBLICATIONS

FAQs [online]. FanDraft, Jan. 16, 2017. Retrieved from the Internet: <URL:www.fandraft.zendesk.com/hc/en-us>.
FAQs [online]. PrimeTime Draft, Jan. 16, 2017. Retrieved from the Internet: < URL:www.primetimedraft.com/faqs.php>.
Signs & Posters [online]. vistaprint, Jan. 16, 2017. Retrieved from the Internet: <URL:www.vistaprint.com/category/signs-and-banners>.

* cited by examiner

*Primary Examiner* — Marcellus Augustin
(74) *Attorney, Agent, or Firm* — Creativenture Law, LLC; Dennis J M Donahue, III

(57) ABSTRACT

A system and method for designing and printing fantasy draft board posters using a client computer communicating with a host computer. The host computer provides a design interface to a user, and the user selects a template design. The template design requires a user to input a variety of client-defined material with a header, and select the number of teams and rounds. The client-defined material is displayed actively on a scratch pad image, and determines the dimensions of the final format of the draft board poster. The final print image file for the poster is then created and printed.

19 Claims, 11 Drawing Sheets

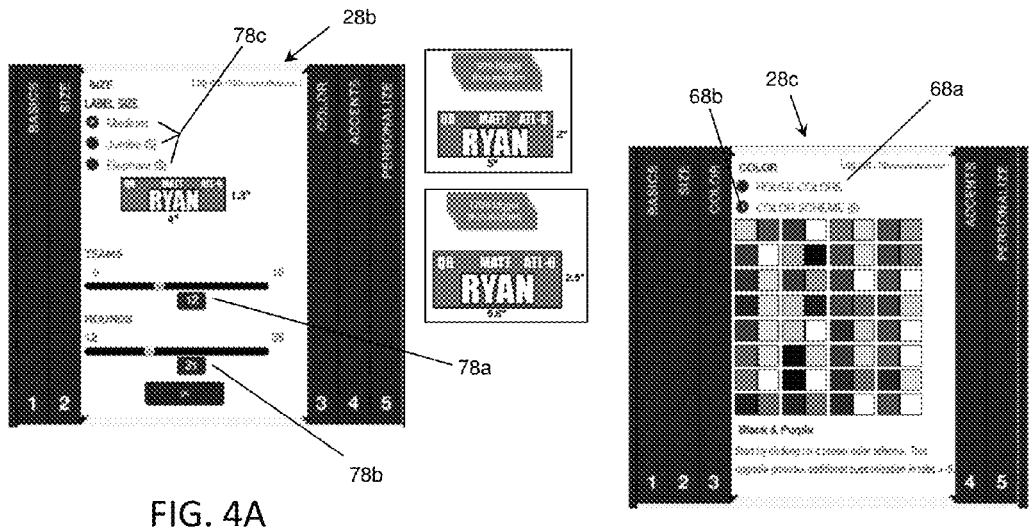
FIG. 4A
FIG. 4B
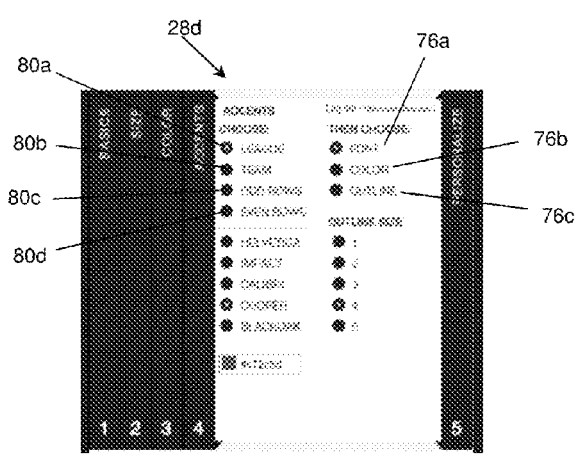
FIG. 4C
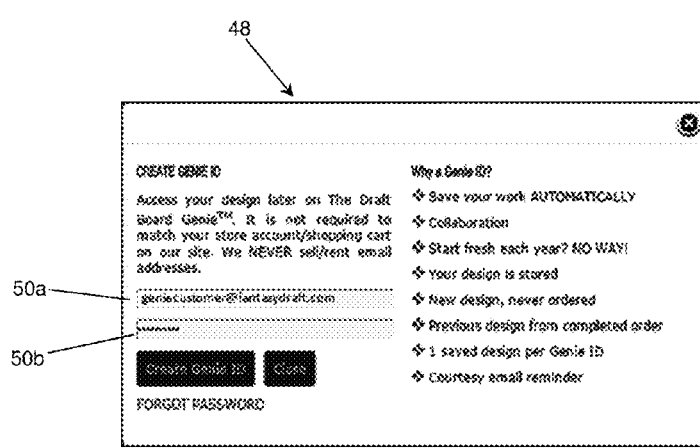
FIG. 5

SYSTEM AND METHOD FOR DESIGNING AND PRINTING FANTASY SPORTS DRAFT BOARD POSTERS

CROSS-REFERENCE TO RELATED APPLICATIONS

This application is a utility application claiming the benefit of provisional patent application No. 62/286,985 filed Jan. 26, 2016, which is hereby incorporated by reference.

STATEMENT REGARDING FEDERALLY SPONSORED RESEARCH

Not Applicable.

APPENDIX

Not Applicable.

BACKGROUND OF THE INVENTION

Field of the Invention

The present invention generally relates to a method and system for creating posters, and more particularly to a method and system for designing and printing fantasy sports draft board posters.

Related Art

Current design and printing systems are known to enlarge photographs and print them as posters using a global network of computers (the "internet"). There are numerous poster producer websites that end users can access through the internet using a standard browser application for designing and printing posters. The end users can upload image files to the poster producers through the browser application and manipulate the image files using a graphic design program that is resident on the poster producer's host computer system. In some systems, such as in U.S. Pat. No. 6,911,992, the host system provides a poster generation website interface to users' computer browsers that allow the users to select a poster template, populate the template with images to be incorporated into the poster, manipulate the images within copy holes of the poster, and request a preview image of at least part of the poster. According to the particular teachings of the '992 patent, the host system generates a preview image that is provided to the user's computer browser and a determination is made whether the image file has a resolution that satisfies a predetermined resolution threshold. Additionally, the host system provides to the user's computer browser a poster representation in the form of a low resolution image of the poster template which allows the user to visualize a representation of the poster as the user manipulates the images using the computer browser that is accessing the graphic design program on the host system.

The determination whether the image file has a resolution that satisfies a predetermined resolution threshold is a critical aspect of the invention disclosed by the '992 patent. Additionally, the use of a low resolution image as the poster representation instead of the full resolution that is required to satisfy the predetermined resolution threshold is also a critical feature of the invention because most users of such a poster designing and printing system would not have the bandwidth and internet speeds necessary for the users' computers to edit or otherwise manipulate the images in their full resolution. The use of a low resolution image for the entire image, including the template features as well as the user's uploaded images, is an inefficient system because the template features are within the control of the host system and would certainly satisfy the predetermined resolution threshold. In fact, in the particular example disclosed by the '992 patent, the preview image selected by the wire frame encompasses a portion of the host system's template image and a portion of the user's uploaded image. If there is to be a determination of the resolution threshold requirement, a more efficient system would only check the images that are being uploaded.

It would be beneficial to improve the efficiency of internet-centric systems such as disclosed in the '992 patent so that the bandwidth available to users' computers over their respective networks can be optimized. According to U.S. Pat. No. 9,077,823, there are innovative solutions for saving bandwidth while editing images and image products online to make the entire experience more efficient and easier for users practicing the invention. However, the solutions disclosed and suggested by the '823 patent also fail to consider graphic design systems in which the host system provides one or more template images at satisfactory resolutions and users are able to upload images and enter text to merge with the template images. These systems must also provide a mechanism for formatting the uploaded images or entered text to create a desired final poster.

A significant deficiency of current poster generating systems, is the recommendation of a poster size to meet the resolution requirements of the image and other characteristics of the poster that a user has inputted into the system. Most systems allow a user to choose the poster size, and then adjust the image resolution accordingly. However, such systems may create an unsatisfactory product because a preview of the product displayed on a display device is an insufficient representation of the actual product. For example, the Vistaprint® design-to-print system allows a user to choose the orientation, poster size, materials, and template, but as a user continues to add further elements, the system does not automatically change the size of the poster or even recommend that the user modify the size of the poster. The result could be that the user receives a final product that may be an inappropriate size and/or visually unflattering.

Other systems that are commonly used for creating a customizable fantasy draft experience are electronic draft board systems, such as those provided by the FanDraft service and the PrimeTimeDraft service. These systems are available over the internet to provide a customizable media experience within a single location and to connect remote users through the platforms. These systems do not provide an actively updated image that allows a user to view their draft board in real time as the user inputs their design information. As the draft boards are created, a series of information is requested from the users, such as team names, owner names, team logos, team images, and even team songs. The draft board can be viewed after the information is input into the system. These enter-first-review-later systems may be satisfactory for electronic draft boards which only need to meet aspect ratio requirements of monitor screens or projectors, but such systems are unacceptable for designing draft boards that are to be printed with a variety of different sizes and different aspect ratios because the known systems have no reason to evaluate changes in draft board sizes that may be beneficial based on different sizes of the cells in the draft board matrix as well changes in the numbers of teams and rounds in the draft which respectively define the rows and columns in the matrix. Even if current systems that are used for designing electronic draft boards were to offer different aspect ratios, changes in the absolute size or aspect ratio may require users to either restart the design process or continue the edit-first-review-later process and resubmit the selections in an iterative basis until a desired draft board layout is reached.

Electronic draft board systems do not have any need to resize the league name and other information in the header because they are not bound to a specific space within which printed text must be fit. Instead, electronic draft board systems can have scrolling headers, dropdown menus, popup windows, and even countdown timers. Due to these electronic-centric functions, these purely electronic draft boards unsatisfactory for creating a print-ready draft board poster. Merely printing a screenshot of an electronic draft board would not be an adequate printed draft board because of the limited electronic formatting options. Additionally, even if the information entered for the electronic draft board were mapped into a print-version of the draft board, significant redesign of the draft board would be necessary to make an acceptable print-version of the draft board.

Accordingly, even with the advancements in the field of online print-ready design programs and electronic draft board design programs that may run on individual computers, traditional servers, and cloud-based servers, there remain inefficiencies in the design of specially formatted posters which allow for variable sizes and numbers of matrix elements and which also allow for a header that can include text and graphics, such as found in draft boards. As users increasingly move more of their work to mobile computer systems, including tablets and smart-phones and want to access print-ready design program systems through these mobile devices, the improved efficiencies and ease of use of the host systems will become even more important.

BRIEF DESCRIPTION OF THE DRAWINGS

The present invention will become more fully understood from the detailed description and the accompanying drawings.

FIGS. 4A-4C respectively illustrate size, color, and accent menus;

FIG. 5 illustrates a log-in window to the system;

FIGS. 11A-11C respectively illustrate an optional selection screen, an invoice, and an order management screen.

DETAILED DESCRIPTION OF THE PREFERRED EMBODIMENTS

The following description of the preferred embodiment(s) is merely exemplary in nature and is in no way intended to limit the invention, its application, or uses.

Figure 1:
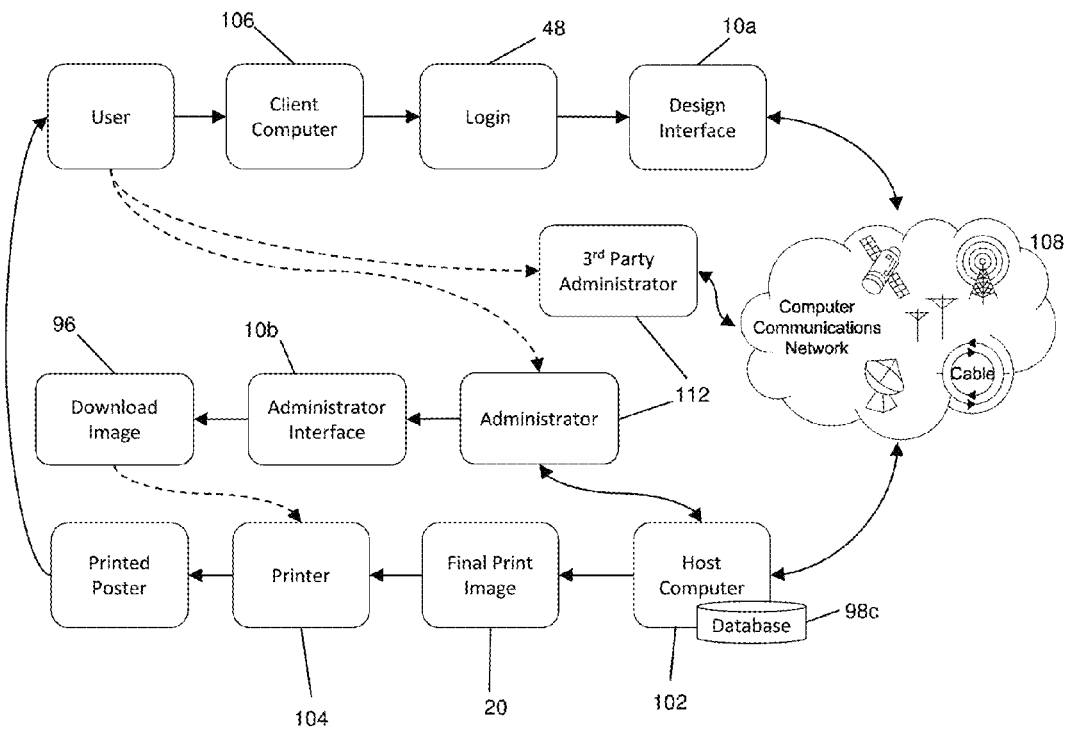
FIG. 1 illustrates a flow chart of the draft board design and print system.
Figure 3:
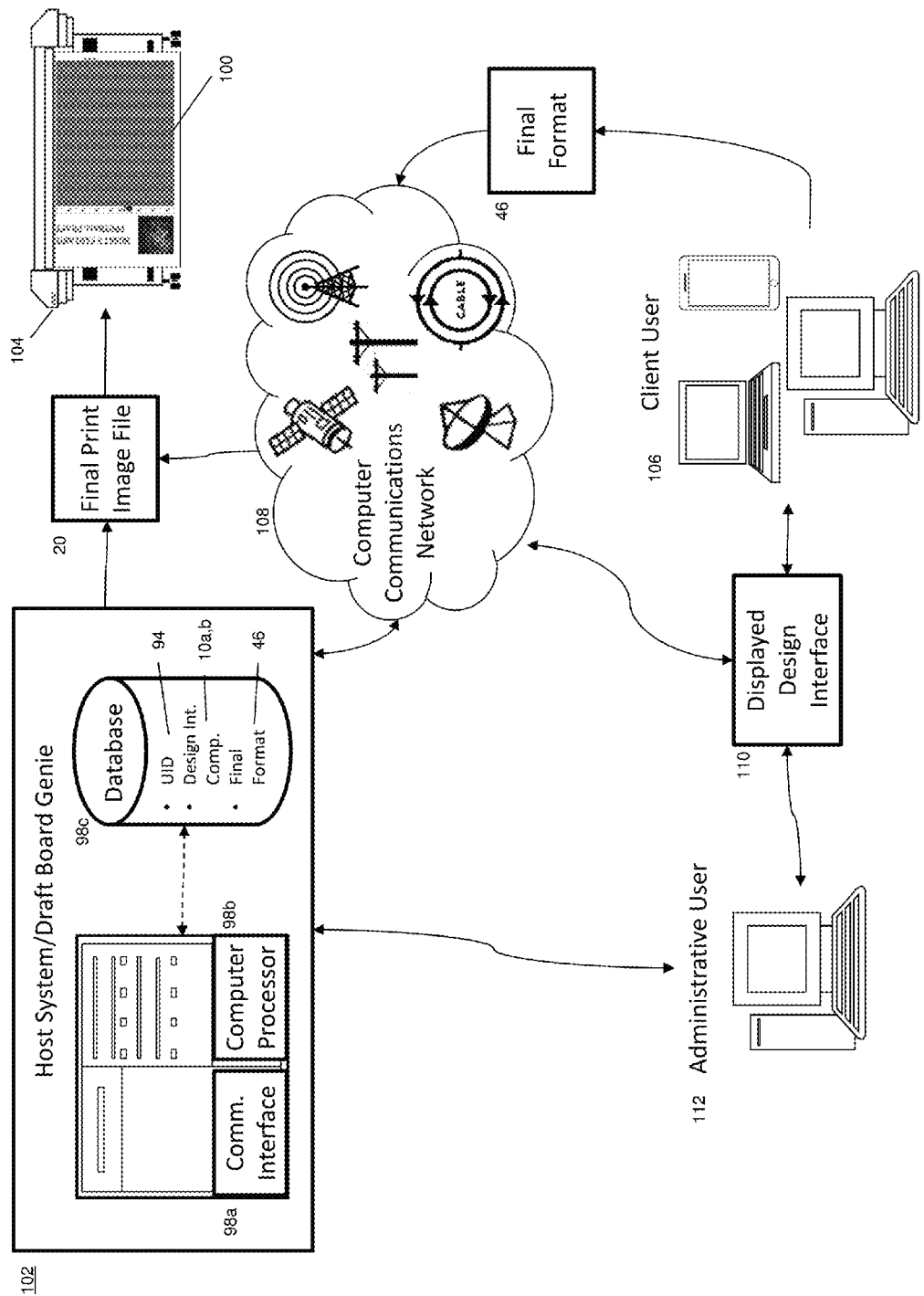
FIG. 3 illustrates a system diagram of the draft board system.

The present invention is a system and method for designing and printing draft board posters 100 using a client computer 106 communicating 98a with a host computer 102 over a computer network 108, shown in FIG. 1 and FIG. 3. The host computer 102 provides a design interface 10 to the client computer 106, and a user operating the client computer 106 selects a template design 12. The template design 12 includes a scratch pad image 16 and selection menus 28. The scratch pad image 16 has a matrix 24 with columns 60a and rows 60b respectively corresponding with the numbers of teams and rounds and also a header 26 with a text field 32 for the league name. The header 26 may also have a graphic image space 30. The client computer 106 populates the header 26 with a text string 38 and/or graphics 36 from an image file, and a final format 46 and resolution for the draft board poster 100 and produces a print image 20 in the final format 46. The scratch pad image 16 of the draft board poster 100 is schematically rendered with a standardized representative format 44 that may be different from the final format 46 of the draft board poster 100. The final print image 20 file for the poster is created and printed on a large format printer 104.

The present invention improves the efficiency for web-enabled design programs for print-ready draft board poster images that are provided by the host system 102 to users' client systems 106. Since web-enabled computing typically operates at approximately 5% of the speed of an application running over a local area network (LAN) and even less than 5% of the speed of an application running directly on a computer without any network delays or bandwidth limitations, the use of the scratch pad image 16 in the present invention as an approximate rendering of the poster's graphic design increases the efficiency of the system. The scratch pad image 16 uses orders of magnitude less bandwidth to render the approximation of the poster design as compared with the bandwidth that would be required to render the full resolution image of the poster graphic design or even a traditional low-resolution representation of the poster's graphic design. The scratch pad image 16 optimizes the performance of the present system's web-enabled application so that it can even run on mobile phones. The user can complete the design on a mobile phone or log into the system 48 later through a web-based networked computer and complete the poster graphic design.

Users access the print-ready design program on the host computer 102 through the design interface 10 to select the template design 12 for the draft board poster 100 and upload images 34 and enter text 42 to merge with the selected template design 12. The design interface 10 provides various options in the selection menus 28. The options include different label sizes 78c, shown in FIG. 4A, and color schemes 68b, shown in FIG. 4B, the number of teams in a fantasy sports league 78a, and the number of rounds 78b for the draft. However, it will be appreciated that the sizing of the text 40 and the graphics 36 on the scratch pad image 16 could be performed by the client computer 106. Regardless of which computer performs the sizing for the client-defined material on the scratch pad image 16, the client computer 106 uploads the client-defined material to the host computer 102 so that the host computer 102 can properly size the preview image 18 and the print image 20 according to the final format 46.

According to the particular aspects of the present invention, the host system 102 automatically formats, scales and sizes the template design 12 at satisfactory resolutions for the draft board poster 100 that is to be printed 104. As stated above, since the host system 102 controls the resolution of the template design 12, the present invention saves computing power and network bandwidth in communicating with users' client computer 106 by schematically rendering the template design 12 on the scratch pad image 16. The schematic rendering has a standardized representative format 44 which differs from the final format 46 of the draft board poster 100.

The scratch pad image 16 of the draft board template design 12 is interactively communicated from the host computer 102 to the client computer 106 through the computer network 108 while the client-defined material is uploaded to the host computer 102 from the client computer 106. The elements of the draft board poster are schematically rendered on the scratch pad image 16 in a standardized representative format that can be different from the final format 46 of the draft board poster. The sizing of the text 40 and the graphics 36 on the scratch pad image 16 is preferably performed on the host computer 102 side and communicated to the client computer 106.

The preview image 18 in the final format 46 is communicated from the host computer 102 to the client computer 106 through the computer network 108 in response to an indication from the client computer 106 that the draft board poster 100 is ready for printing. As explained in more detail below, the host computer 102 receives either a save command or a modify command after communicating the preview image 18 to the client computer 106. The host computer 102 creates a final print image 20 file for the draft board poster 100 in the host computer 102 in response to the save command and transmits the final print image 20 file to the printer 104, preferable a large format printer 104, which prints the draft board poster 100 using the final print image 20 file.

The host computer 102 system defines the final format based on parameters provided by the client computer 106 through the design interface 10 when selecting the template 12. The host computer 102 automatically resizes the text field 32 to fit within the header 26' as the text string 32 changes from a first length 54*a* to a second length 54*b*. The host computer 102 automatically modifies the scratch pad image 16 to show the populated header 26 as the text field 32 is resized from the first length 54*a* to the second length 54*b*. Additionally, the host computer 102 automatically modifies the scratch pad image 16 to show the resizing of the text field from the first length 54*a* to the second length 54*b* in the populated header 26 when the image file 34 is also uploaded to the header 26.

When the user has made the appropriate selections and populated the header 26 to the user's satisfaction and submits the draft board 100 for printing, the system provides the user with a rendering of the draft board 100 in the final format 46 of the print image 20 for the user's review. There are actually multiple headers in the template design 12 according to the present invention, including the header 26 at the top of the draft board 100 for the draft board heading text 32 and images 30 and the column header 62 for uploading a team name text 64*a* or team logo 64*b* at the top of the draft board matrix 24.

This final format 46 view of the draft board poster 100 allows the user to visualize the draft board poster 100 in the same format and relative sizing of the client-defined material as it fits into template design 12 and will be printed. After having reviewed the final format view 46, the user can either choose to have the draft board printed or may go back into the design 10 portion of the print-ready design program to change the template design 12 and/or the client defined material. When the user confirms the design, the system finalizes and locks the print image file 20 in the final format 46. As described in further detail below, once the print image is locked, it can be placed into a shopping cart by itself or with other items. When the order is complete, the print image file is placed in the system's queue for printing.

Create Genie ID

The online print-ready design program is referred to as the Draft Board Genie system (i.e., the Genie system). FIG. 5 illustrates the interface for allowing a user to create a Genie ID which is their own user identification that allows the user to come back later without losing their work. The Genie ID can be an email address or some other alphanumeric identifier which is unique to each individual user.

Preview

Figure 7A:
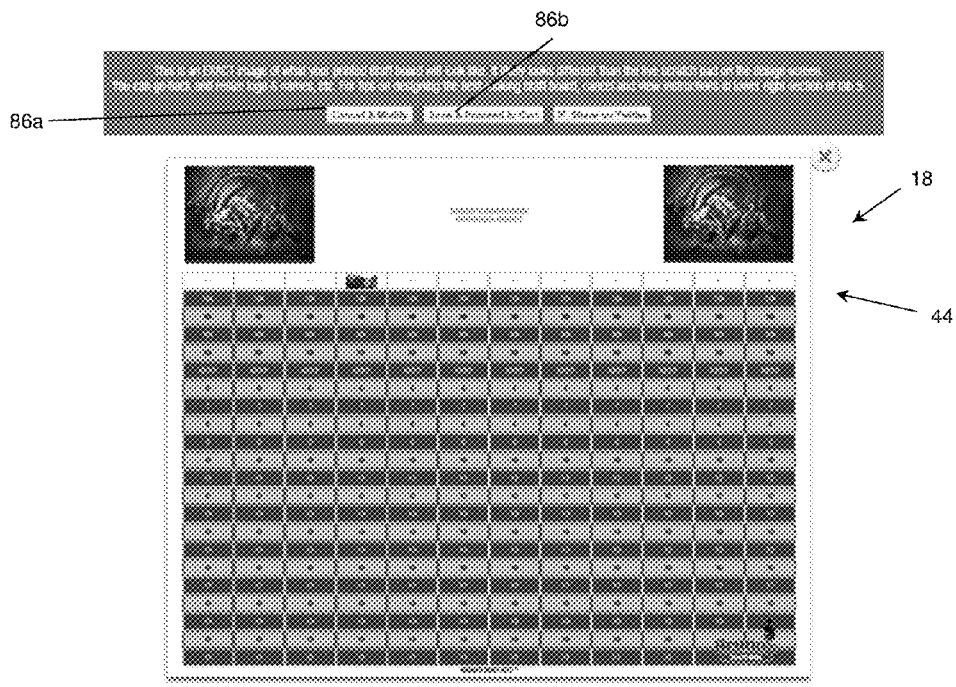
FIGS. 7A and 7B respectively illustrate a preview image and a final image.
Figure 7B:
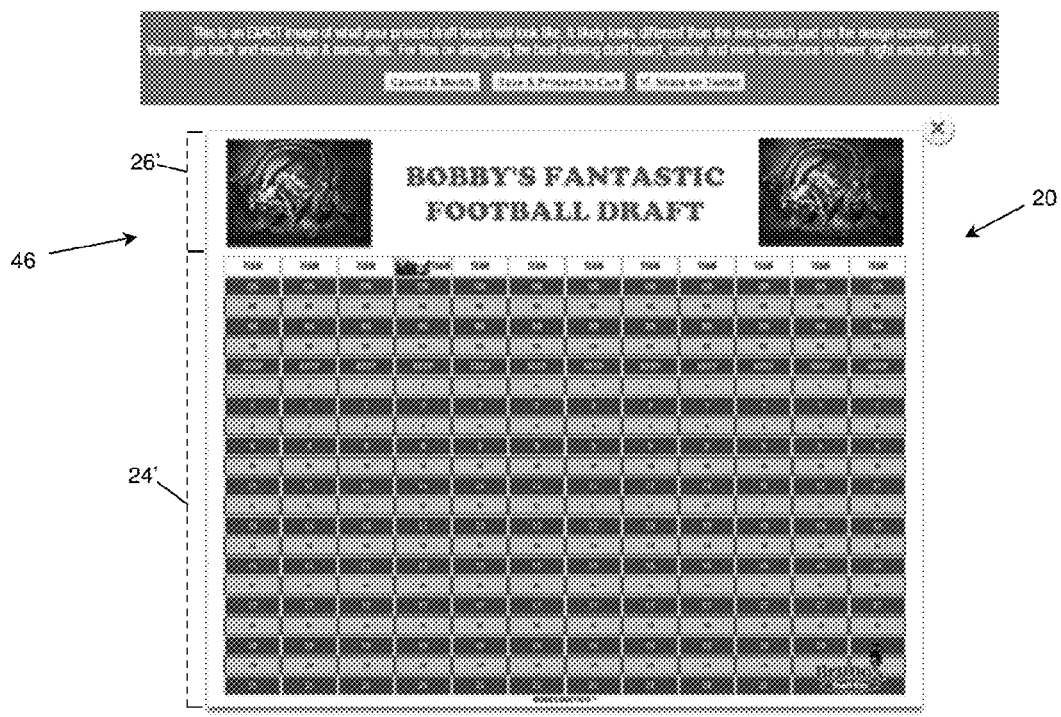

By pressing the Preview button at any point in the process the system will render a hi-res image for the user showing a final print image 20, which can be seen in FIGS. 7A and 7B. This corrected image in FIG. 7B is superior to the scratch pad preview 16 and the first preview image 18 shown in FIG. 7A, and FIG. 2. As can be seen by in FIG. 2, the scratch pad preview's 16 header 26 and matrix 24 are comprised of text and graphics that have not been formatted by the host computer 102. The text field 32 is of a small size leaving unused space, and the matrix has not been altered by user input. The final print image 20 is comprised of a formatted header 26' and matrix 24' based on user input and adjusted graphic 30 and text field sizes 32. These images 20 are the exact representations of the respective images that would be printed.

An upgrade to banner from paper changes the dimensions and allows the logos to be larger than before. Also, as shown in FIG. 7A, the league name 32 and the team names appear 64*a* to be too small within the available header space 26. It is likely that a user would cancel and make appropriate changes, mainly in the personalize menu 28*e*, to change the size of both the league 84*a* and team names 84*b*. As evident from a comparison of FIG. 7B to FIG. 7A, the changes to the size of the text 40 makes the content much more visible.

In some cases, when the user first obtains the preview image 18, the user may find that there is little space at the top of the draft board 12, which results in small text 32 in the header 26. The user is able to make several adjustments to enhance the draft board's 12 layout, such as changing label size 78*c* in the size menu 28*b*, adding or removing rounds 82*a*, changing from a two line league name 32 to a single line, which would allow the user to adjust the font size 40. It will be appreciated that the label size 78*c* defines the minimum size of the cells within the matrix.

By pressing the Preview button at any point in the process the system will render a hi-res image for the user showing a final print image 20, which can be seen in FIG. 7B. This image is the exact image that would be printed. This image is superior to the scratch pad preview 16 and the preview image 18 shown in FIG. 7A.

Basics Menu

Figure 2:
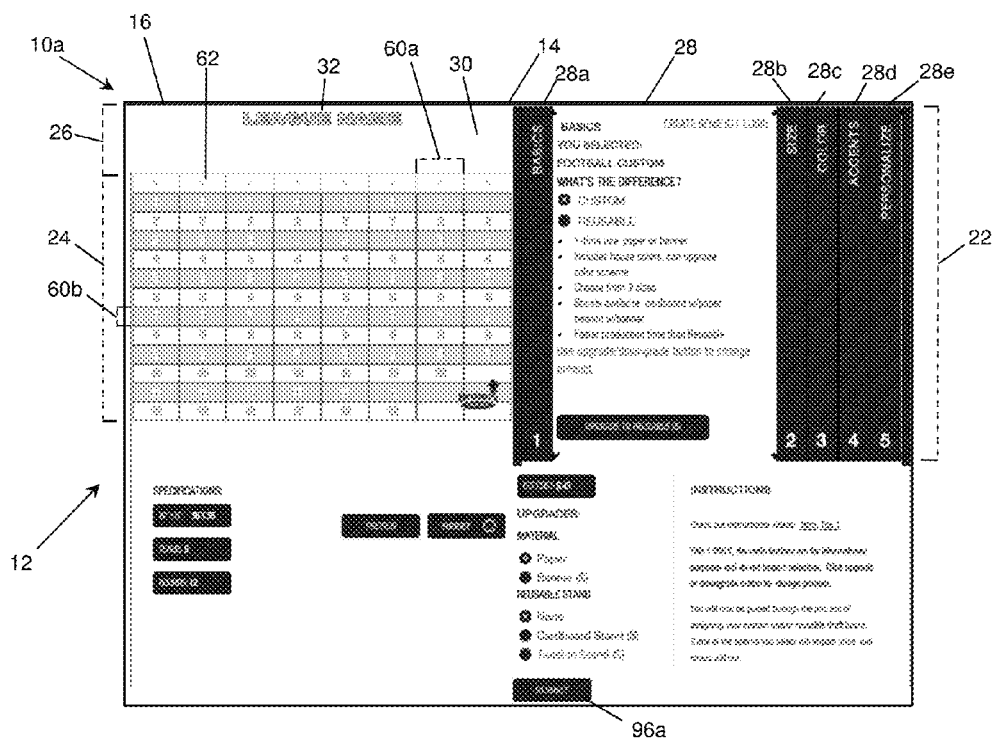
FIG. 2 illustrates a template scratch pad and basic menu of the draft board system.

FIG. 2 shows the first selection menu 22. The basics menu 28*a* allows a user to upgrade/downgrade to reusable or one-time use draft board. Also shows difference between custom and reusable draft boards.

Upgrades

A user can choose to upgrade the material on which the draft hoard 100 is printed. Paper is the cheaper default, and this determines which, if any, stand is offered. Paper draft boards go with cardboard stands. Draft boards printed on banner stock go with the higher priced tension stands.

The system offers the appropriate upgrade based on users choice of material. The change from paper to banner often changes the dimensions of the draft board (boxes at bottom left), which would change the preview and finished print.

Size Menu

The size menu 28b is shown in FIG. 4A. The user determines how large their draft board will be based on the number of teams 78a, the number of rounds 78b, and the label size 78c. The label size 78c can be chosen among medium, jumbo, and elephant. Since that the label size defines the absolute size of the cells within the matrix, the larger the label size 78c, the bigger the board 100 will be for a given number of teams 78a and rounds 78b, i.e., the columns and rows in the matrix, which are specific to each individual league. The scratch pad preview 16 can be displayed in a fixed-size area that adjusts based on the teams 78a and rounds 78b or can be displayed in an area that may vary in height or width. In the particular embodiments shown in FIGS. 2, 6, 9, and 10, the width of the matrix in the scratch pad image remains fixed while the height of the matrix can change as the rows are increased or decreased. However, the size of the boxes on the scratch pad preview 16 does not change based on the label size 78c. It will be appreciated that since the number of teams 78a defines the number of columns 60a and the number of rounds 78b defines the number of rows 60b, a selected label size 78c defines a minimum height and width of the cells that form the rows and columns in the draft board 100 that is to be printed.

Color Menu

FIG. 4B is the color menu 28c. Users can select house colors 68a (generally cheaper) or choose a starting point by selecting a color scheme 68b. The scratch pad image 16 updates based on the chosen color. Virtually every color component on the draft board 100 is further customizable at the accent menu 28d.

Accents Menu

FIG. 4C illustrates the interface for the accents menu 28d. The accents menu 28d allows a user to change any aspects of the text field 32 at the top of the draft board 100 by selecting league 80a, including color 76b, outline accents 76c, and font 76a. If outline size 76c or font 76a is not selected a default option will be rendered. For any custom colors 76b, the color picker will be activated when that option is available.

Figure 6:
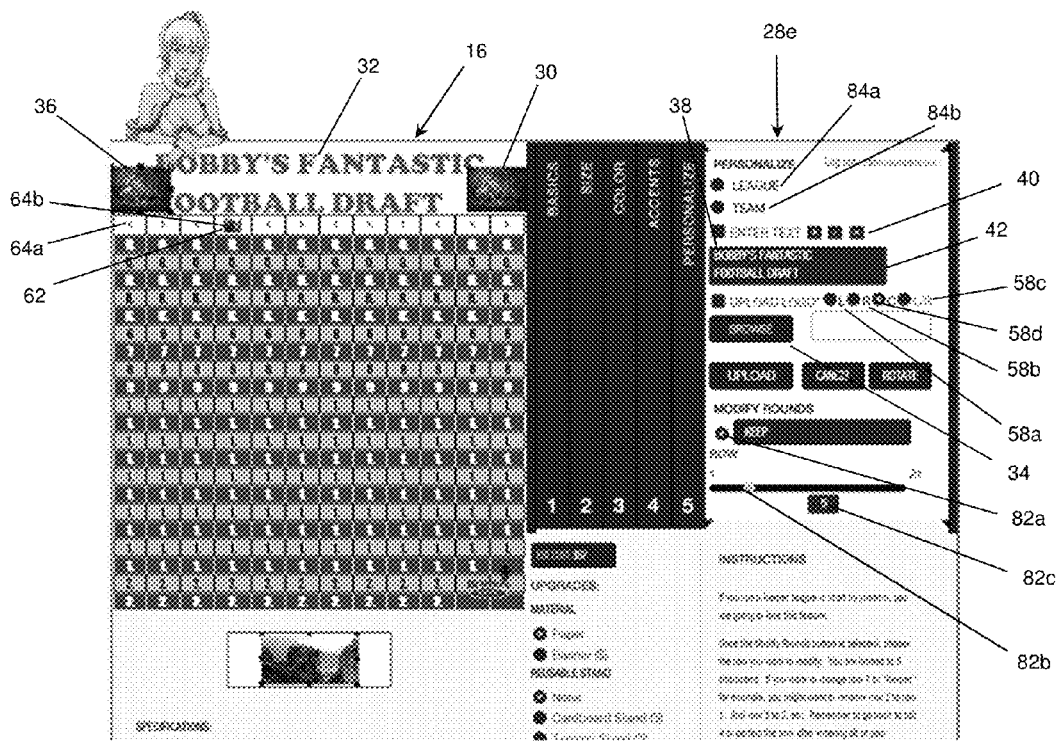
FIG. 6 illustrates a modified scratch pad and personalize menu.

The odds 80c and even 80d rows selection works exactly the same as the league selection 80a customization except that ALL odd rows or ALL even rows will be formatted identically instead of just a single row. FIG. 6 shows the draft board colored in alternating rows which is traditionally the look of the draft boards 100 and adds visual appeal for the group at the draft.

Further, a user can change the variables related to the team name row 64a at the top of the draft board just below the header 26 by selecting team 80b. The scratch pad preview image 16 does not show this sufficiently, but the preview image 18 in FIG. 7A and final print image 20 in FIG. 7B does. A user can change the color of the text 76a or the color of the box 76b or the color of the box outline 76c. All boxes are formatted identically. You can also choose a different font 76a and change the size of the outline 76c if desired. Text will be resized at the personalize menu 28e.

Personalize Menu

By selecting league within the personalized menu 28e, shown in FIG. 6, a user can insert a logo 30 within the header 26. If L, R, L/R is selected the logo will be in addition to league name text 32. If 'C' 58d is chosen, the logo 30 will be centered at top of draft board in place of text. If L/R 58c is chosen, the logo 30 will be duplicated so that it goes on both the left and right side of the league name. The logo 30 may also be placed on either the left or right side by selecting 'L' 58a or 'R' 58b, respectively. Logo 30 is resized 36 automatically based on the amount of available space and changes with the draft board dimensions selected in the size menu 28b.

If a user selects modify rounds 82, they will be able to change the look of the draft board 100. Instead of numbering the rounds (rows) from 1 to X, where "X" is the number of rounds selected at the size menu 28b, some leagues have specific needs at the draft. Due to the fixed size limitation of the scratch pad image 16, it is possible that only the first letter of a custom round name may be viewed on the scratch pad image 16, but the full custom round name will be shown in the preview image 18 and the final print 20. For example, as shown on FIG. 6, the "QB" for rounds 1-2 is shown as "Q.", "RB" for rounds 3-4 is shown as "R.", and 'KEEP" for round 5 is shown as "K." on the scratch pad image 16, but the full name for each of these rounds is shown on the preview 18 and the final print 20, as shown on FIGS. 7A-7B. The slider 82b at the bottom of the personalize menu 28e works similarly to the team name slider, and a display text box 82c is shown to indicate which row is being changed. Generally, the changes to the scratch pad image provide feedback to the user that the entries have been made to the selection with a schematic representation of the draft board, and the preview image shows the user a realistic image of the customized draft board.

Personalize League Name

This crucial customization is the main reason for a custom draft board 100. User can enter text 38 in the upper black box 42 which corresponds to the header 26 when "league" is checked. Text size 36 can be increased or decreased with the +/−36 buttons. A "max" text button may also be included which automatically resizes the text field 32 to the largest size available in the header 26. User is allowed 27 characters or less on 1 or 2 rows.

Team Logo

As shown in FIG. 6, the 4th column header 62 comprises a team logo image 64b. User can insert a logo 64b for each team, much like they would for a league logo 30. Main difference is that there is a much smaller space available for the team logos 64b. User can choose to have a logo 64b and team name 64a in column header 62, although the general recommendation is to go with logo 64b OR team name 64a due to the formatting restrictions due to available space.

To specify which team is to be modified, the user selects team 84b and chooses which column/team 60 they want to modify using the slider 82b at the bottom. The slider starts with team 1 and automatically ends with the last number of teams available (in this case 12). Personalization of teams is done on an individual box basis instead of by entire row.

Notice the box directly below the scratch pad image 16 in the fourth column from the left shows a team box preview.

Final Proof

Figure 8A:
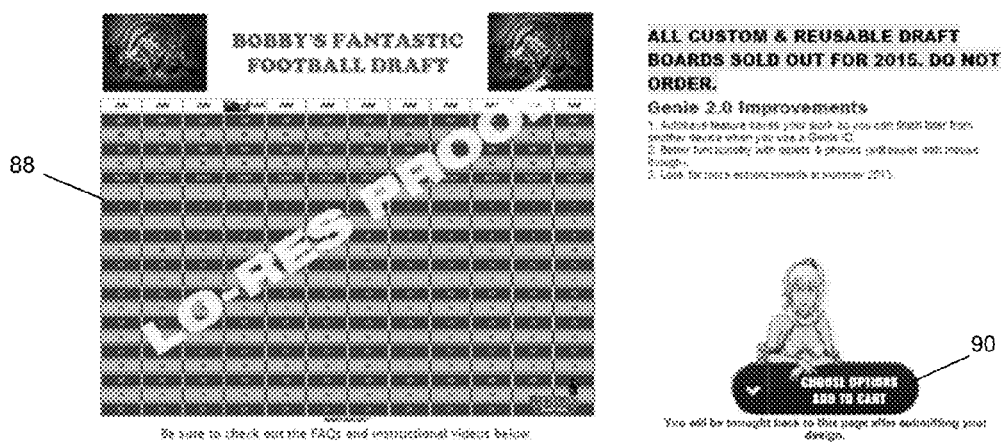
FIGS. 8A-8C illustrate a progression of checkout screens.

When user clicks submit button at any point, a final preview 18 is rendered which lets user cancel and make changes or proceed to cart and finish the order, as shown in FIG. 8A.

In this example, the user may proceed to checkout by clicking the save and proceed button 86b, or preferably the user would realize that there is too much available space within the header 26 and select cancel and modify 86a. They could make several adjustments to make it look better including: change label size 78c, add or remove rounds 82a, or alter the text string 38, which would allow them to also increase the font size so the outline would not overpower the red font.

Final Proof-Revised

In FIG. 7B, the quality of the graphic looks much better than the first final proof. By simply changing the size of the text 40, the content is much more visible. From here the user would select save and proceed to cart 86*b* to finish the purchase.

Proceed to Product Page

The final proof 20, which is approved, is rendered on small scale as "lo-resolution" image 88 on the product page, shown as FIG. 8A. Once a user adds options, they finalize the design and add the product to their shopping cart. The finalized design is locked preventing the user from making further changes to the design within the design interface 10. If changes are needed, the user must start the process over or contact an administrator 112. The system associates a Unique ID (UID) 94 to the finalized poster image file 20. The UID 94 is particularly helpful for the user and administrator to identify the user's finalized design 20. It will be appreciated that the UID is different from the user's Genie ID; the UID uniquely identifies the finalized poster image file whereas the Genie ID identifies the user account. Accordingly, the UID can be associated with a user's account which is identified by their Genie ID.

As stated before, a user can contact an administrator to make changes to the finalized design 20. The UID 94 is provided by the user to an administrator so the administrator can locate and access the locked design 20. Administrative users are able to continue to make changes even after standard users have created the finalized design and have locked it in the shopping cart.

View Shopping Cart

Figure 8B:
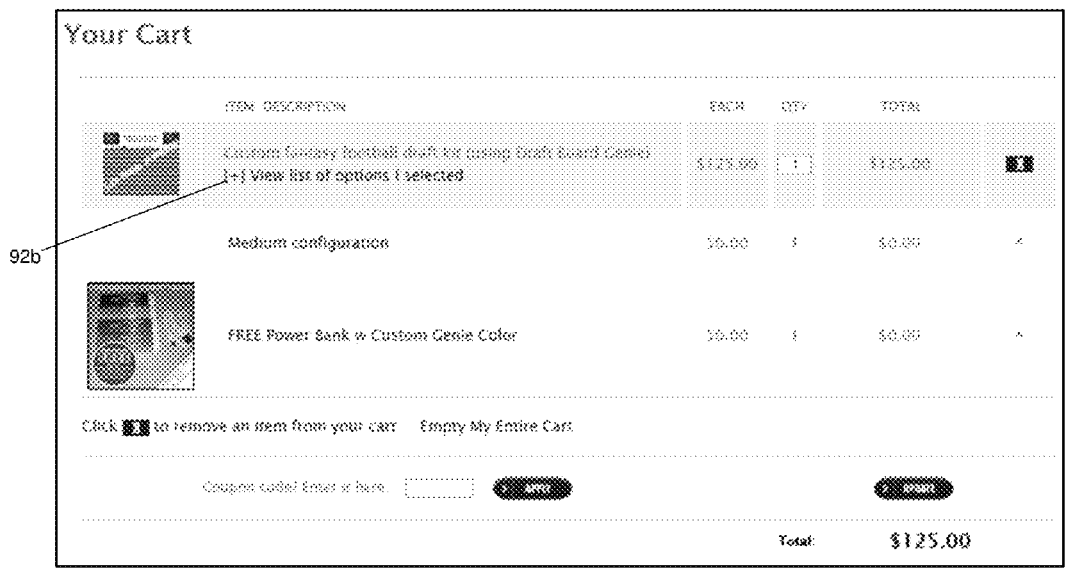
Figure 8C:
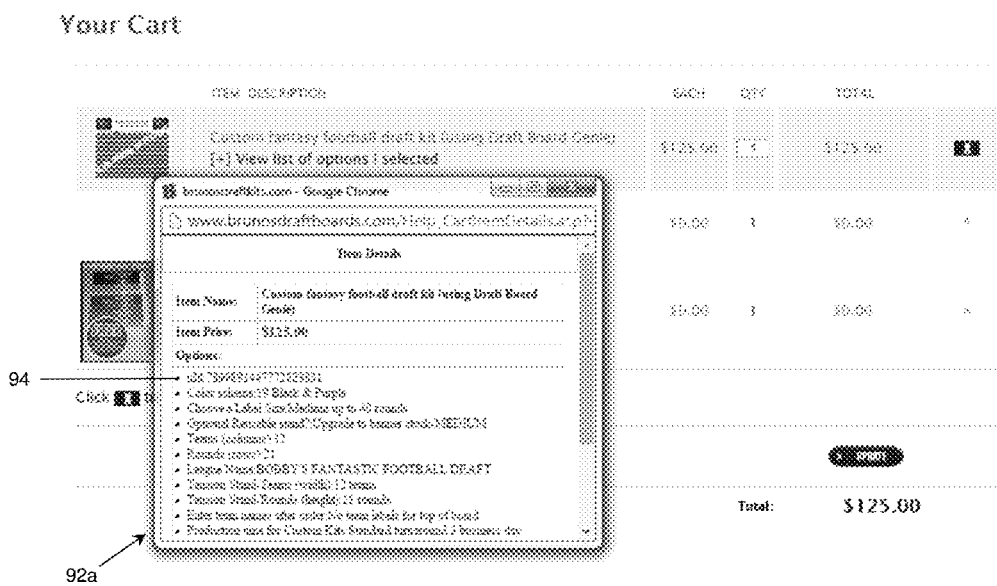

The shopping cart is illustrated in FIG. 8B. Similar to any shopping cart software, this view simply shows the items with a description, the individual costs of the items, the total cost of all the items, and quantity of the items being ordered. Here, the "lo-resolution" image 88 of the draft board poster 100 is shown along with one other item within the shopping cart. From this point forward, the UID 94 is stored on the back end of the receiving company within a database 98*c*, so that the correct item is ordered.

As seen in FIG. 8B, the item descriptions include a "+" button 92*b*, which allows the user to view the list of options that the user had chosen in designing the draft board. When the user clicks the plus button ("+"), pop-up box 92*a* is preferably displayed with all of the selections to the options associated with the draft board 100. Note the UID 94 is shown in this box. The UID 94 is the key to keeping the designs in order. Every time the system is launched by a user, a new UID 94 is created, and after the user's order has been printed, the old UID 94 can be rendered obsolete.

Max Text Feature

FIGS. 9A-9E illustrate the reformatting and resizing of the graphic image 30 and text field 32 to reach the maximum text size 40 with different designs. In a preferred embodiment, the "Draft Board Genie" system 102 is a print-ready design program that recalculates the amount of space available within the header 26 for the graphic image 30 and the text field 32. The print-ready design program calculates the paper size automatically based on the size of the template design 12 and the features selected by the user. The maximized text size feature described n detail below and illustrated in FIGS. 9A-9E helps users avoid the potential for header text to be scaled too small for the available space in the preview print image, such as shown in FIG. 7A, and ultimately the final print image. Additionally, the maximized text feature can be used with the scratch pad image to scale the header text as it is shown with graphic elements in the header which prevents the header text from extending into the space reserved for the header graphic elements.

For example, a user who chooses a jumbo template design 12 will see that a feature selection of 18-21 rounds 78*b* fits onto a poster which has a 42" height. If the user increases the feature selection to 22 rounds 78*b*, the print-ready design program increases the poster height to 54". The size recalculation is particularly beneficial to the present invention because posters not designed for draft boards 100 would not have a need for automatically reformatting and resizing to the largest text size 40. In another example, a poster height of 54" for a feature selection of 18 rounds would result in an excessive amount of unused white space at the top of the poster above the chart matrix. The print-ready design program calculates the space remaining at the top of the chart above the chart matrix and automatically resizes the text to fit within the space, i.e., the available text space.

Without the calculation of the available text space, a user would have to manually rescale the text 36 by selecting the "+" button 92*b* in the personalize menu 28*e* in a trial and error method to hone in on the text sizing 40 that would be accommodated by the space available. For example, depending on the amount of text 38 entered and the space available, a user may not have to increase the size 40 of the text or may need to select the "+" button 92*b* twenty-five (25) times or forty (40) times. As shown on the personalize menu 28*e*, when a logo 30 is added to the scratch pad image 16, it may appear that the text field 32 is actually too big, as shown in FIG. 6, but when the user submits the image, the preview image 10 in FIG. 7A may indicate that the text is too small. To resize the text in the trial and error method, the user must select the "Cancel and Modify" button and resize the text accordingly. Without the automatic resizing process, this manual resizing process must be repeated until the text size 40 fits within the space to the satisfaction of the user.

The automatic space calculation and text resizing 40 also eliminates the distorted image issue that is present on the scratch pad image 16. Since the scratch pad image 16 is just a working representation of the features being selected for the poster, without the automatic space calculation and text resizing 40, a user would need to enlarge the text field 32 so much that the text field 32 actually goes off the screen or behind the logo image 30, as seen in FIG. 6. The automatic space calculation and text resizing 40 improves the accuracy of the scratch pad image 16 rendering without requiring significant additional bandwidth and eliminates the need for the user to perform the trial and error text sizing 40 method.

An alternative solution to the resizing of text could convert the text to an image which could be resized to the available space, either proportionately or not. This would be an exorbitantly difficult thing to do because of the detail in the final proof image that is used for printing the draft board poster. Also, converting the text to an image would eliminate the user's ability to change the text interactively. To interactively resize the text on the final proof image 20 rather than the scratch pad image 16 would require significantly more bandwidth than is available to most users' computer system 106. Due to the limited bandwidth currently available to most users' computer systems 106, interactively working on the final proof image 20 is not preferred but could become a preferred operation in the future when bandwidth increases by orders of magnitude from current levels.

Figure 9A:
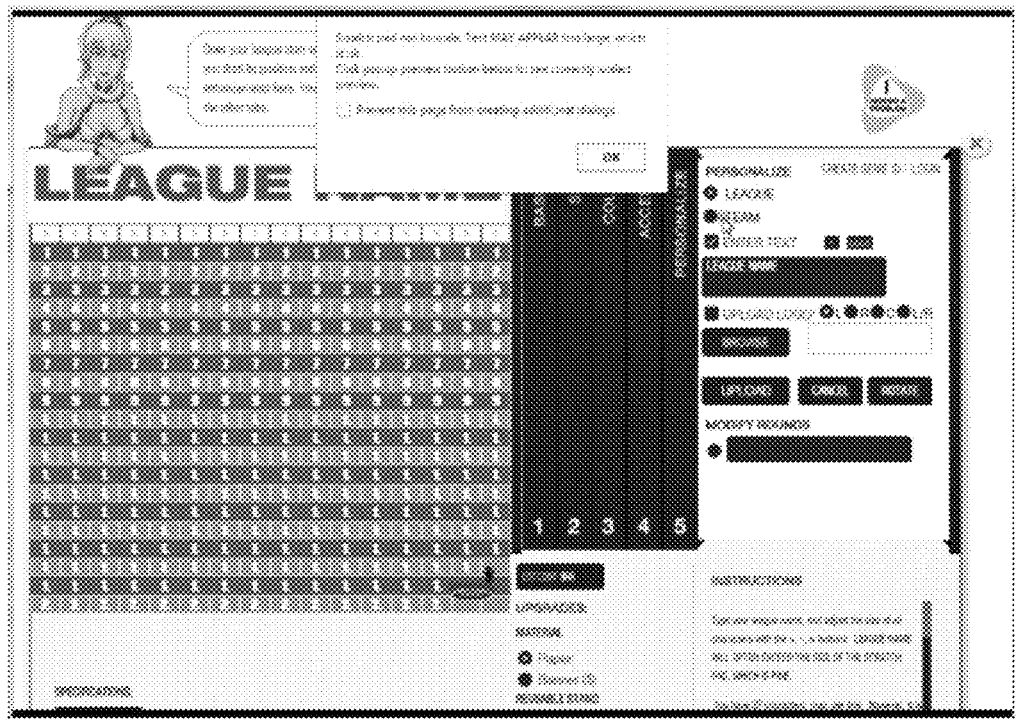
FIGS. 9A-9E illustrate automated format changes in the header.
Figure 9B:
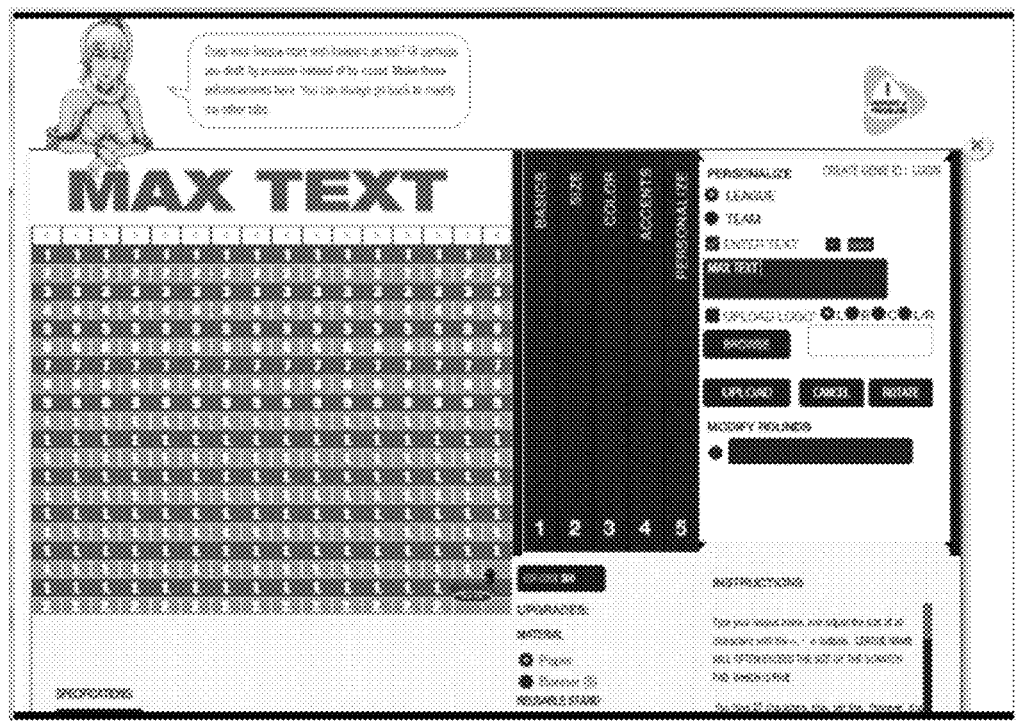
Figure 9C:
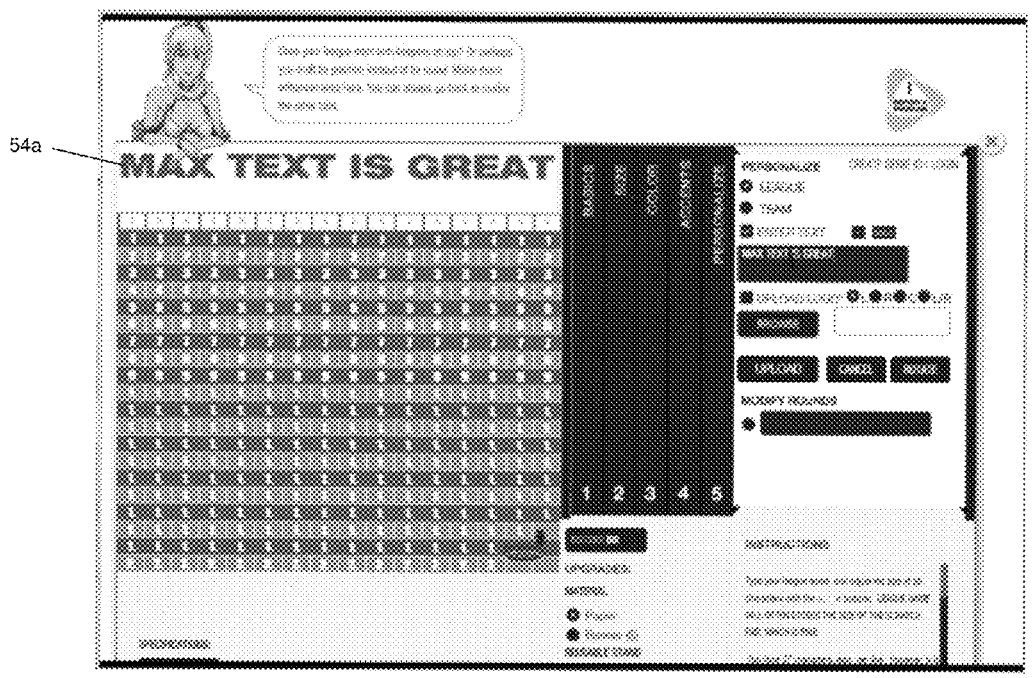
Figure 9D:
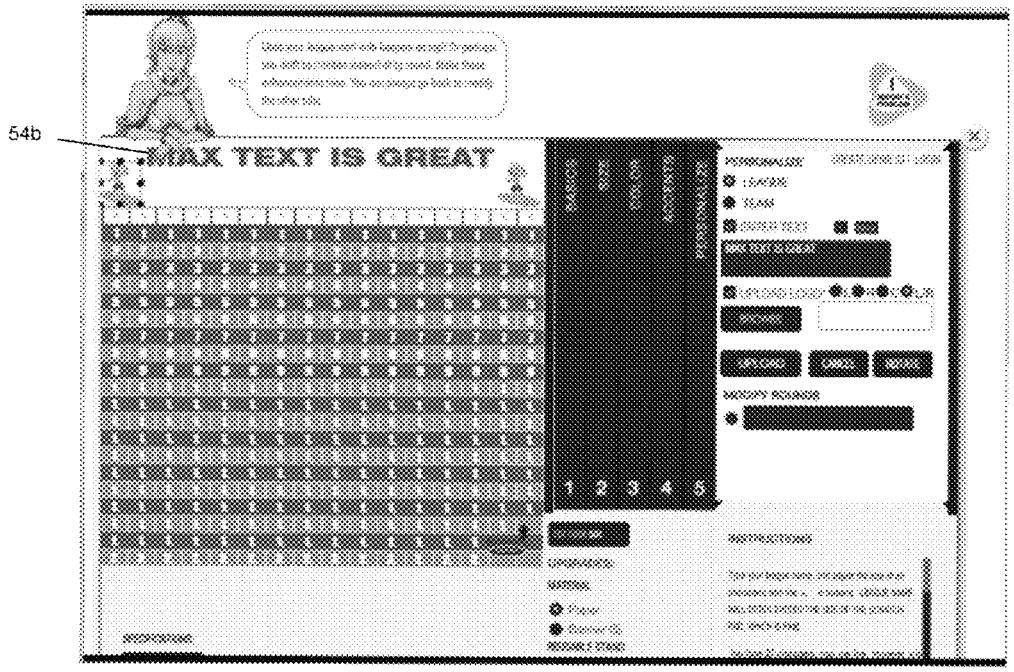
Figure 9E:
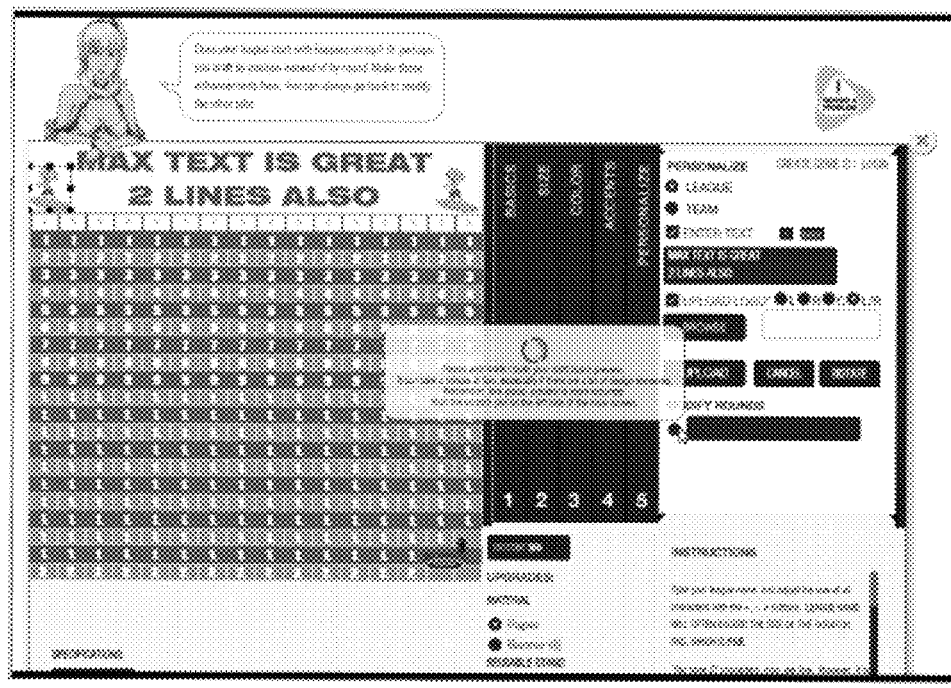

As the size of the draft board 100 is changed, the text field 32 at the top will change based on the amount of horizontal and vertical space available. By using the 'Max Text Feature', the user can instruct the host computer 102 to automatically resize the text string entered through the client computer 106 to fit the header 26 at the top of the draft board template 12. As shown FIGS. 9A-9C, when a user changes "LEAGUE NAME" and enters the words "MAX TEXT" and then adds "IS GREAT" into the space for the League Name, the size of the text is automatically reduced in the scratch pad image 16 to show that the text field 32 fits into the header 26. The Max Text feature also accounts for images added to the header 26 at the top of the draft board template, as illustrated in FIGS. 9D-9E, such as a league logo 30. With a logo 30 placed on one side of the header 26, the text 32 is reduced in size 40 and with a logo 30 placed on both sides, the text 32 shrinks accordingly.

The automatic sizing of the text field 32 and images 30 is also performed for the final format 46 of the preview image 18 which will ultimately become the print image 20. In the scratch pad image 16, the host system shows how text fits within the header 26. As more text is added to the text string, there will be less space on the preview and the text will automatically shrink on the scratch pad image 16. This feature is preferably used for the League Name header 26 and may also be used for the Team Name header 26. The automatic sizing also accounts for the varying amounts of space available depending on the user-selected size of the draft board 100, i.e., label size 78c, and the changes to the draft board 100 absolute layout size that the system defines based on the user-selected number of teams 78a and number of rounds 78b. For a given absolute size of the draft board 100, an increase in the number of rounds 78b decreases the space available for the text field 32. The change in available space is exemplified with a jumbo-sized draft board 100 that has sixteen (16) rounds in one case and seventeen (17) rounds in another case. In this case where the absolute size of the draft board 100 remains the same, the space required for the additional round takes away from the available space as evident in the drawings.

It is also possible for the system to resize the absolute size of the draft board 100 depending on the number of teams 78a and rounds 78b, and this could also impact the space available for the text field 32. For a given user-selected draft board size (e.g., jumbo) 78c with fourteen (14) teams and sixteen (16) rounds, the system produces a jumbo size having a width of seventy-four inches (74") and a height of forty-two inches (42"). If the user instead selects fourteen (14) teams and twenty (20) rounds in a jumbo size, the system produces the jumbo size having a width of 74" and a height of 54" and results in increased available space for the league name 32. If the size of the draft board 100 is still kept as jumbo, but the team total 78a are changed from fourteen (14) teams to eighteen (18) teams, the system will automatically increase the width of the draft board from 74" to 94" in order to accommodate the additional four (4) teams. Accordingly, there will be the same amount of available space for the text field 32 at the top of the draft board 100. The system also account for the amount of space taken by the logos 30 in calculating how much available space remains available for the text field 32.

Admin Mode of Operation

The admin mode of operation 112 for the system is launched separately from the user experience 106, and interacts directly with the host computer 102, as illustrated in FIG. 1 and FIG. 3. This is an alternative to the traditional use of the system, and is performed if a user wishes to speak directly to an admin. The admin mode 112, shown in FIG. 10, of operation uses the system 102 to format, size and scale the various draft board features in preset template arrangements without requiring the administrative user to manually layout the features in a graphic design computer program. The admin mode can be used to create draft board images that are available to be ordered as generic draft boards and may be used as example draft boards on the Genie system's web interface or in promotional materials which may be in a print format or an electronic format, such as e-mails, electronic publications, social media postings, and broadcasts.

Figure 11A:
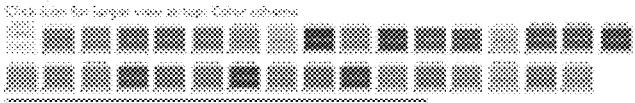
Figures 11B, 11C:
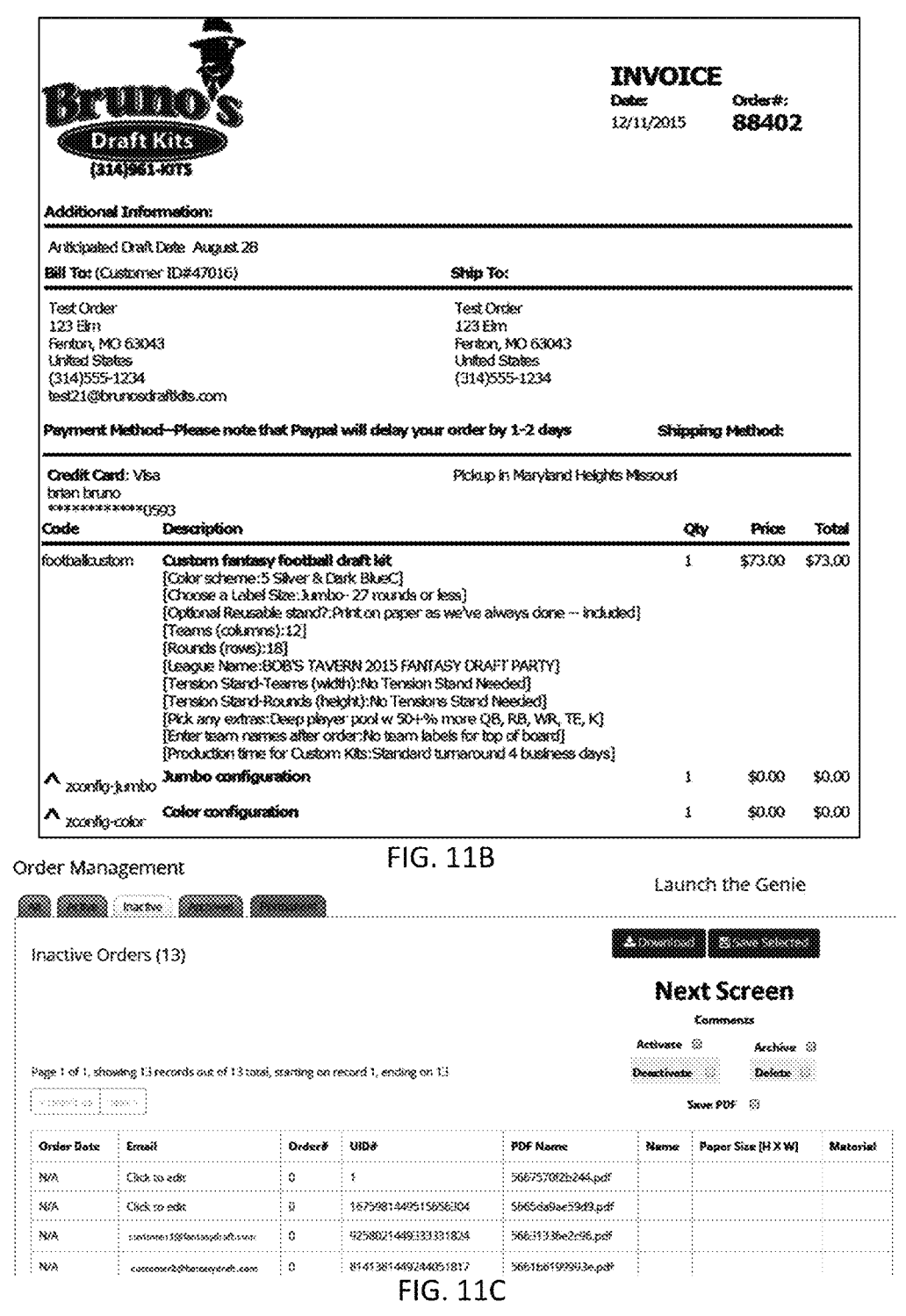

FIG. 11A shows the list of features for a customized draft board poster that a user can select from a menu of options and submit through the Genie system so that an administrative user can enter the selected features through the design program and create the print image file for the customer. The system summarizes the user's selections in an invoice document as shown in FIG. 11B which is submitted to the administrative user. The administrative user enters the user's selections into the Genie system 102 to design a customized draft board 100 quickly for the user.

Figure 10:
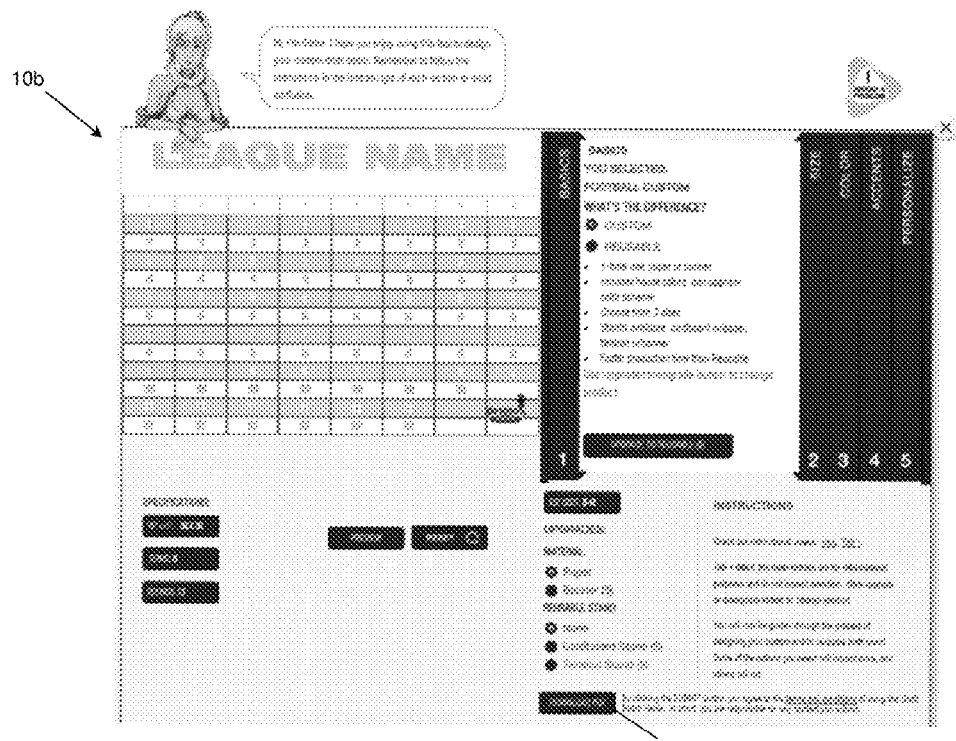
FIG. 10 illustrates a design screen for an administrative client.

During the admin mode of operation 112, the system is not linked to the store so there is no login ID needed to define the admin user's project, and there is no "SUBMIT" button 96a, shown in FIG. 2, in the admin mode of operation. As illustrated in FIG. 10, instead of the "SUBMIT" button 96a that instructs the system to create a final preview for non-administrative users, there is a "DOWNLOAD PDF" button 96b, which instructs the system to immediately produce the final image 20 for the completed custom draft board without creating a final preview 18. Of course, the particular terminology used on the buttons can be changed without any change in the scope of the present invention. For example, the "DOWNLOAD PDF" button 96b could alternatively read "CREATE FILE" or some other instructive text. Therefore, the admin mode of operation allows the system to perform as a stand-alone piece of software for the admin users to design finished draft boards.

In the example, the specifications for the draft board 100 are entered into the menu-driven order entry forms and orders are uniquely identified by the UID on the order management screen as shown in FIG. 11C. The user selects the size, color schemes, league name and other options. Before the creation of the present invention, the layouts of the draft boards would need to be created using graphic design software with manual operations that were much more tedious than the innovative system which uses the computer program to automatically format the layouts based on the user's selections and other entries, such as the text and illustrations.

The administrative mode of operation 112 is also used when a user wishes to make changes to a final print image 20. On the client system, the final print image 20 is locked preventing a user from making further changes. A user may provide an admin the UID 94 that has been assigned to their draft board 100, and the admin can make further changes.

Alternatively, the administrative mode of operation can be accessed through a computer network 108 to the host computer 102. This allows the host computer 102 to be stored at a remote location or for allowing access to third party administrators.

General System Operation

The general operation of the draft board system begins with the communication of the design 10a or administrative interface 10b to the computer's processor 98b. The interface 10a, 10b can be stored on a local system 106, or provided from a remote host system 102, such as a web-enabled computing system, through a communications network 108. The processor 98b interprets the interface components 10a, 10b to project the scratchpad preview 16, having a header 26 and a matrix 24, and selection menus 28 to a display 110. The processor 98b is also in active communication with an input device for receiving various inputs that correspond to options within the selection menu 28, which include the text string 38 and an image file 34 for the header 26, the number of teams 78a and rounds 78b, and label size 78c. Based on the information received into the processor 98b from the input device, the processor 98b updates the scratchpad preview's 16 header 26 and matrix 24 sections, as well as determines and updates the necessary size of the draft board poster 100 to accommodate the number of selected teams 78a, rounds 78b, and label size 78c. The processor 98b further calculates the maximum text size 40 based on available header 26 space, and rescales the text string 38 for displaying the updated header section 26'. If a graphic image 34 is uploaded, the processor further updates the header 26 to provide a formatted image within the header 26'.

A final print file 20 is generated and can be communicated from the processor 98b to the large format printer 104 through the communications interface 98a. It will be appreciated that the final print files may be communicated to large format printers that are centralized so that the printed draft board posters are then shipped to the users at their various mailing locations. Alternatively, as indicated above, the final print files may be communicated to large format printers that are located at print centers that are close to the users so that the users can pick up the draft board poster as soon as it has been printed. It will also be appreciated that the final print files (or lower resolution representations thereof) may be used in a purely electronic form, such as on a website or other electronic promotional materials as described above.

An important aspect of the present invention is the ability of the processor 98b to calculate the appropriate poster size based on the selected options inputted by the user. The processor calculates the matrix 24 width by multiplying the width of the selected label size 78c by the number of teams 78c. To determine the height, the processor multiplies the height of the selected label size 78c by the number of rounds 78b. The resulting processor calculations provide the minimum required height and width of the matrix 24 to select a necessary poster size.

Prior to communicating the print image file 20 to the large format printer 104, the selected inputs are locked to prevent any further inputs from the input device. The processor associates a unique identifier 94 and stores the selected inputs within a database 98c for retrieving the information at a later time or from a remote third party printing service. A remote or third party printing service may be in communication with an administrator or from services such as FedEx® online printing services to allow for a local printing and pick-up of the final print image 20.

The processor allows further inputs when the print image file 20 is accessed through the administrative design interface 10b. Like the printer 104, the administrative interface 10b can be in local or remote communication with the processor 98b. The administrative interface 10b is further utilized for accepting inputs from an electronic form, such as the one in FIG. 11A. An administrative user inputs the information for receiving by the processor 98b.

The embodiments were chosen and described to best explain the principles of the invention and its practical application to persons who are skilled in the art. As various modifications could be made to the exemplary embodiments, as described above with reference to the corresponding illustrations, without departing from the scope of the invention, it is intended that all matter contained in the foregoing description and shown in the accompanying drawings shall be interpreted as illustrative rather than limiting. "Draft board" is the commonly used vernacular in the industry for a "draft board poster" and these terms are used interchangeably throughout the specification. The term "fantasy" is also know by other names including, but not limited to "rotisserie" and "roto". Thus, the breadth and scope of the present invention should not be limited by any of the above-described exemplary embodiments, but should be defined only in accordance with the following claims appended hereto and their equivalents.

What is claimed is:

1. A method for designing a draft board poster for printing on a large format printer in operative communication with a computer having a processor, a display, a database, a communications interface, and an input device, comprising the steps of:
   communicating a design interface from the processor to the display,
   wherein the design interface comprises a scratchpad preview and a selection menu,
   wherein the scratchpad preview is comprised of a header section with a text field and a matrix section with a plurality of rows and a plurality of columns,
   wherein the header section corresponds with a header space on the draft board poster, and wherein the matrix section corresponds with a matrix space on the draft board poster;
   receiving in the processor a set of inputs to the selection menu from the input device, wherein the set of inputs is comprised of a text string, a selected row number, and a selected column number;
   determining in the processor an updated header section and an updated matrix section of the scratchpad preview respectively corresponding with the text string and with the row number and the column number,
   wherein the processor determines a poster size for the draft board poster to be printed by the large format printer based on the row number, the column number, and a cell size,
   wherein the processor defines the header space according to the poster size, wherein the processor automatically determines a maximum text size for the text string according to the header space, and
   wherein the processor rescales the text string for displaying in the updated header section; and
   creating a print file for the draft board poster with the cell size, row number, and column number in the matrix space and the maximum text size for the text string in the header space;
   communicating the print file from the processor to the large format printer through the communications interface; and
   printing the print file on the large format printer.

2. The method of claim 1, wherein the set of inputs is further comprised of a label size having a height and a width defining a minimum size for the cell size, and wherein the determining step is further comprised of the steps of:
   selecting the label size from a set of optional label sizes;
   multiplying the row number by the height to determine a minimum matrix height;
   multiplying the column number by the width to determine a minimum matrix width; and defining the poster size necessary to satisfy both the minimum matrix width and the minimum matrix height with the header space.

3. The method of claim 2, wherein the set of inputs is further comprised of a graphics file, wherein the processor formats an image in the graphics file for displaying in the updated header section, and wherein the processor automatically sizes the image for placement in a graphics portion of the header space.

4. The method of claim 1, further comprising the step of changing at least one of the height of the rows and the width of the columns in the updated matrix section of the scratchpad preview.

5. The method of claim 1, further comprising the steps of:
repeating the communicating step, the receiving step, and the determining step for a set of user accounts;
creating a set of print files corresponding with the set of user accounts; and
correlating the set of print files with the set of user accounts in the database according to a corresponding set of unique user identifiers.

6. The method of claim 5, further comprising the steps of:
locking the set of inputs entered into the database through a non-administrative user account in the set of user accounts after the print file has been created;
providing an override authorization to an administrative user account in operative communication with the non-administrative user account with the locked set of inputs; and
modifying the locked set of inputs in the database with at least one different input using the administrative user account.

7. The method of claim 1, further comprising the steps of:
providing a set of draft board options to a non-administrative user account on an electronic form;
receiving at an administrative user account a set of selections corresponding with the draft board options; and
entering the received set of selections to the processor as the set of inputs using the administrative user account.

8. The method of claim 1, further comprising the steps of:
identifying a local print center to receive the print file;
communicating the print file from the processor to the large format printer at the local print center through the communications interface; and
printing the print file on the large format printer at the local print center.

9. A method for designing and printing a draft board poster by a large format printer in operative communication with a computer having a processor, a display, a database, a communications interface, and an input device, comprising the steps of:
communicating a design interface from the processor to the display, wherein the design interface comprises a scratchpad preview and a selection menu, wherein the scratchpad preview is comprised of a header section with a text field and a matrix section with a plurality of rows and a plurality of columns, wherein the header section corresponds with a header space on the draft board poster, and wherein the matrix section corresponds with a matrix space on the draft board poster;
receiving in the processor a set of inputs to the selection menu from the input device, wherein the set of inputs is comprised of a text string, a label size, a selected row number, and a selected column number, and wherein the label size has a row height and a row width;
determining in the processor an updated header section and an updated matrix section of the scratchpad preview respectively corresponding with the text string, with the label size, and with the row number and the column number;
multiplying in the processor the row number by the height to calculate a minimum matrix height for the draft board poster;
multiplying in the processor the column number by the width to calculate a minimum matrix width for the draft board poster;
determining in the processor a poster size for the draft board poster to be printed by the large format printer, wherein the poster size has a poster width at least as wide as the minimum matrix width and has a poster height at least as high as the minimum matrix height in addition to the header space;
determining in the processor a maximum text size for the text string according to the header space;
rescaling in the processor the text string for displaying in the updated header section;
creating a print file for the draft board poster with the cell size, row number, and column number in the matrix space and the maximum text size for the text string in the header space; and
communicating the print file from the processor to the large format printer through the communications interface.

10. The method of claim 9, wherein the label size is selected from a set of optional label sizes, wherein the set of inputs is further comprised of a graphics file, wherein the processor formats an image in the graphics file for displaying in the updated header section, and wherein the processor automatically sizes the image for placement in a graphics portion of the header space.

11. The method of claim 9, further comprising the step of changing at least one of the height of the rows and the width of the columns in the updated matrix section of the scratchpad preview.

12. The method of claim 9, further comprising the steps of:
locking the set of inputs entered into the database through a non-administrative user account after the print file has been created;
providing an override authorization to an administrative user account in operative communication with the non-administrative user account with the locked set of inputs; and
modifying the locked set of inputs in the database with at least one different input using the administrative user account.

13. The method of claim 9, further comprising the steps of:
providing a set of draft board options to a non-administrative user account on an electronic form;
receiving at an administrative user account a set of selections corresponding with the draft board options; and
entering the received set of selections to the processor as the set of inputs using the administrative user account.

14. A method for creating a draft board poster for printing on a large format printer in operative communication with a host computer system that is in networked communication with a plurality of client computer systems, comprising the steps of:
communicating a design interface from the host computer system to the client computer systems, wherein the design interface comprises a scratchpad preview and a selection menu, wherein the scratchpad preview is comprised of a header section with a text field and a matrix section with a plurality of rows and a plurality of columns, wherein the header section corresponds with a header space on the draft board poster, and wherein the matrix section corresponds with a matrix space on the draft board poster;

receiving in the host computer system sets of inputs to the selection menu from the client computer systems, wherein the each one of the sets of inputs is comprised of a text string, a selected row number, and a selected column number;

determining in at least one of the host computer system and the client computer systems an updated header section and an updated matrix section of the scratchpad preview respectively corresponding with the text string and with the row number and the column number, wherein the processor determines a poster size for the draft board poster to be printed by the large format printer based on the row number, the column number, and a cell size, wherein the processor defines the header space according to the poster size, wherein the processor automatically determines a maximum text size for the text string according to the header space, and wherein the processor rescales the text string for displaying in the updated header section;

creating a print file for the draft board poster in the host computer system with the cell size, row number, and column number in the matrix space and the maximum text size for the text string in the header space; and communicating the print file from the host computer system to the large format printer.

15. The method of claim 14, wherein each one of the sets of inputs is further comprised of a label size having a height and a width defining a minimum size for the cell size, and wherein the determining step is further comprised of the steps of:

multiplying the row number by the height to determine a minimum matrix height;

multiplying the column number by the width to determine a minimum matrix width; and defining the poster size necessary to satisfy both the minimum matrix width and the minimum matrix height with the header space.

16. The method of claim 14, further comprising the step of changing at least one of the height of the rows and the width of the columns in the updated matrix section of the scratchpad preview.

17. The method of claim 14, further comprising the steps of:

repeating the communicating step, the receiving step, and the determining step for a set of user accounts corresponding to the client computer systems;

creating a set of print files corresponding with the set of user accounts; and correlating the set of print files with the set of user accounts in the database according to a corresponding set of unique user identifiers.

18. The method of claim 17, further comprising the steps of:

locking each one of the sets of inputs entered into the host computer system through a non-administrative user account in the set of user accounts after the print file has been created;

providing an override authorization to an administrative user account in operative communication with the non-administrative user account with the locked set of inputs; and modifying the locked set of inputs with at least one different input using the administrative user account.

19. The method of claim 14, further comprising the steps of:

providing a set of draft board options to a non-administrative user account on an electronic form, wherein the non-administrative user account accesses the host computer system using one of the client computer systems;

receiving at an administrative user account a set of selections corresponding with the draft board options; and entering the received set of selections to the host computer system as the set of inputs using the administrative user account.

\* \* \* \* \*